United States Patent Office 3,136,822
Patented June 9, 1964

3,136,822
PROCESS FOR THE PREPARATION OF
BENZOTRIFLUORIDE
Leo J. Frainier, Jr., Columbus, Ohio, assignor to Olin Mathieson Chemical Corporation, a corporation of Virginia
No Drawing. Filed May 2, 1961, Ser. No. 107,075
3 Claims. (Cl. 260—651)

The present invention relates to a process for the preparation of benzotrifluoride. More particularly, the present invention resides in a process for the preparation of benzotrifluoride by reacting together benzotrichloride and liquid hydrogen fluoride.

It is known to prepare benzotrifluoride by reacting together benzotrichloride and hydrogen fluoride; however, the known processes for this reaction have been accompanied by numerous disadvantages. One known method for preparing benzotrifluoride comprises reacting together liquid hydrogen fluoride and benzotrichloride in an autoclave under pressure. This reaction is accompanied by a pressure rise due to the liberation of low boiling hydrogen chloride; therefore, it is dangerous and inconvenient. In addition, it is desirable to avoid reactions run under pressure due to the added expense attendant thereon. Another method for the preparation of benzotrifluoride comprises the slow addition of gaseous hydrogen fluoride to liquid benzotrichloride. In order to obtain good yields by this method extended reaction times are required. In addition, the use of gaseous hydrogen fluoride presents an added inconvenience. Various other methods for the preparation of benzotrifluoride by the reaction of benzotrichloride and hydrogen fluoride require the use of catalysts. The use of catalysts presents an added raw material expense. In addition, methods for the preparation of benzotrifluoride by the above reaction, if run at atmospheric pressure, obtain low yields i.e., low conversion of benzotrichloride, or require extended reaction times in order to obtain practical yields.

It is, therefore, an object of the present invention to provide an improved process for the preparation of benzotrifluoride by the reaction between benzotrichloride and hydrogen fluoride.

It is an additional object of the present invention to provide a process for the preparation of benzotrifluoride by the reaction between benzotrichloride and liquid hydrogen fluoride at substantially atmospheric pressures.

It is a still further object of the present invention to prepare benzotrifluoride by the foregoing reaction in high yields i.e., high conversion of benzotrichloride, and in reasonably short reaction times.

It is an additional object of the present invention to provide an improved process for the preparation of benzotrifluoride by the reaction between benzotrichloride and hydrogen fluoride, which improved process is characterized by a simple reaction mechanism and inexpensive and non-hazardous operating conditions.

Additional objects and advantages of the present invention will appear hereinafter.

In accordance with the process of the present invention it has now been found that the foregoing objects and advantages may be accomplished and benzotrifluoride prepared by reacting together at substantially atmospheric pressures benzotrichloride and a stoichiometric excess of liquid hydrogen fluoride. By the process of the present invention the benzotrichloride is slowly added to the hydrogen fluoride at a rate so that the reaction temperature is maintained below about 19° C. and the resultant benzotrifluoride product recovered.

The benzotrichloride is slowly added to liquid, anhydrous hydrogen fluoride with the rate of addition of the benzotricholride being maintained so that the temperature of the reaction does not exceed 19° C., and preferably so that the temperature of the reaction is maintained between about −4 and 19° C. It is preferred to use a stoichiometric excess of hydrogen fluoride in order to insure completion of the reaction. The time of addition of the benzotrichloride will naturally vary depending upon the size of the run and the reaction temperature. In a batch run, generally from 15 minutes to 3 hours has been found to be adequate. It should be understood that the process of the present invention is readily adaptable to be run on a batch scale, a semi-continuous scale or a continuous scale. In a continuous operation, the benzotrichloride is continuously introduced and a portion of the reaction mixture periodically withdrawn and transferred to one or more subsequent reactors for completion of the reaction.

The process of the present invention is preferably conducted at substantially atmospheric pressures. The hydrogen chloride gas which is formed as a by-product is continuously removed. The hydrogen fluoride which is vaporized under the conditions of the reaction is preferably condensed and the condensed hydrogen fluoride returned to the reaction mixture. It is preferred to return substantially all of the hydrogen fluoride to the reaction mixture. In addition, it is preferred to return to the reaction mixture substantially all of the organic material which is carried up by evolved hydrogen chloride. In the preferred embodiment of the present invention the evolved hydrogen chloride would pass through the hydrogen fluoride condenser and out of the reaction system.

It is important in the process of the present invention that the reaction mixture be agitated. In the preferred embodiment the reaction mixture is continuously agitated both during addition of benzotrichloride and during the reaction period subsequent to the addition time. Agitation is important in view of the fact that hydrogen fluoride is only slightly soluble in both benzotrichloride and benzotrifluoride and most of the reaction occurs at the interface.

The time necessary for completion of the reaction will naturally vary depending upon the benzotrichloride feed rate, agitation speed, proportions of reactants and reaction temperature. In a batch operation the reaction time will normally vary between about 30 minutes and 8 hours. Generally, the reaction is continued until hydrogen chloride evolution ceases. This indicates substantial completion of the reaction. At the completion of the reaction two layers are formed. The upper, lighter layer contains substantially unreacted hydrogen fluoride and the lower, heavier layer contains substantially benzotrifluoride. The lower layer is withdrawn and the benzotrifluoride is recovered from contaminants by conventional methods. The benzotrifluoride normally contains small quantities of residual hydrogen fluoride. The hydrogen fluoride may be removed by conventional procedures, for example, with aqueous potassium hydroxide.

No catalyst for this reaction is required. It is an advantage of the present invention that very high conversion of benzotrichloride can be obtained without the necessity of a catalyst. Naturally, conventional catalysts for this reaction may be used if desired.

In the process of the present invention the advantages obtained thereby will be readily apparent from a consideration of the following examples.

The following examples illustrate the process of the present invention.

EXAMPLES 1–5

Liquid hydrogen fluoride, 430 grams (21.5 moles), was charged into a one-liter, three-necked, Monel flask equipped with a heavy duty magnetic stirrer and a condenser. The hydrogen fluoride was agitated moderately and 224 grams (1.146 moles) of benzotrichloride was added at a constant rate. The rate of addition was 2.4±0.3 grams per minute and the time of addition was 1 hour and 42 minutes. At the end of the addition period, the reaction was continued until hydrogen chloride evolution ceased, an additional 2 hours and 19 minutes. The reaction temperature was maintained between 5 and 8° C. during the entire reaction period. After the completion of the reaction, the flask was chilled to −10° C. and the two phases allowed to separate. The lower, organic phase containing benzotrifluoride product was then removed by means of a polyethylene syphon. The total weight of organic material removed was 118 grams. Additional hydrogen fluoride was added to replace that consumed in the reaction and the process was repeated for a total of five cycles with additional benzotrichloride being slowly introduced in each cycle. The conditions for each cycle and amount of materials are given in the following table. During the five cycles vaporous hydrogen fluoride was continuously condensed and returned to the reaction mixture. Hydrogen chloride formed during the reaction was continuously removed and the organic material carried with it was continuously returned to the reaction mixture. When the fifth cycle had been completed the total organic phase for the five cycles was treated with water and potassium hydroxide in order to bring the pH up to about 10. An organic phase and an aqueous phase were formed and the aqueous phase was extracted with ether. The ether extract was added to the organic phase and the resultant solution dried with anhydrous magnesium sulfate and distilled. A total of 909 grams of benzotrifluoride was isolated, representing a yield of 86.4 percent. The results are summarized in the following table.

Table I

| Example | HF charged | | BTC charged | | BTC addition time, hours | Additional reaction time, hours | Reaction temp., °C | | Organic removed, grams |
|---|---|---|---|---|---|---|---|---|---|
| | Grams | Moles | Grams | Moles | | | Max. | Min. | |
| 1 | 430 | 21.5 | 224 | 1.146 | 1.42 | 2.19 | 8 | 5 | 118 |
| 2 | | | 242 | 1.238 | 1.30 | 3.42 | 14 | 6 | 125 |
| 3 | 150 | 7.5 | 319 | 1.632 | 2.00 | 4.04 | 11 | 3 | 251 |
| 4 | 100 | 5.0 | 292 | 1.494 | 2.00 | 3.40 | 4 | 2 | 202 |
| 5 | 95 | 4.75 | 340 | 1.739 | 2.30 | 5.35 | 2 | 0 | 266 |
| Total | 775 | 38.75 | 1,417 | 7.249 | | | | | 962 |

HF=Hydrogen fluoride. BTC=Benzotrichloride.

The following examples are given for comparison and illustrate the reaction between benzotrichloride and hydrogen fluoride at superatmospheric pressure.

EXAMPLES 6–9

Benzotrichloride and hydrogen fluoride were charged into a Monel autoclave and rocked while at various temperatures and pressures, with the reaction conditions and amounts of materials being given in the following table. When the temperature and/or pressure reached equilibrium for one hour, the autoclave was cooled to ambient temperature and the excess pressure vented. The contents of the autoclave were poured into a polypropylene beaker, the excess hydrogen fluoride diluted with water, neutralized with sodium hydroxide and the organic phase drawn off. The aqueous phase was filtered, extracted with ether and the ether extract combined with the organic phase. The organics were dried with anhydrous magnesium sulfate and distilled to recover the benzotrifluoride product. The results are summarized in the following table.

Table II

| | BTC | | HF | | Hours rocking | Hours to const. pressure | Temp., °C | | Pressure (p.s.i.g.) | | Yield percent |
|---|---|---|---|---|---|---|---|---|---|---|---|
| | Grams | Moles | Grams | Moles | | | Start | Max. | Start | Max. | |
| 6 | 97.8 | 0.5 | 100 | 5.0 | 4.8 | 4.8 | 2 | 41 | | 260 | 47.2 |
| 7 | 97.8 | 0.5 | 100 | 5.0 | 3.75 | 2.75 | 9 | 62 | | 450 | None |
| 8 | 97.8 | 0.5 | 50 | 2.5 | 2.8 | 1.8 | 7 | 59 | | 450 | 14.9 |
| 9 | 391.0 | 2.0 | 200 | 10.0 | 10.7 | >5 | 9 | 63 | | 290 | 65.4 |

HF=Hydrogen fluoride. BTC=Benzotrichloride.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the preparation of benzotrifluoride by reacting together at substantially atmospheric pressure benzotrichloride and a stoichiometric excess of liquid hydrogen fluoride which comprises slowly adding said benzotrichloride to said hydrogen fluoride at a rate so that the reaction temperature is maintained below 19° C., agitating the reaction mixture, and recovering the resultant product.

2. A process for the preparation of benzotrifluoride by reacting together at substantially atmospheric pressure benzotrichloride and a stoichiometric excess of liquid hydrogen fluoride which comprises slowly adding said benzotrichloride to said hydrogen fluoride at a rate so that the reaction temperature is maintained below 19° C., continuously agitating the reaction mixture, condensing evolved, gaseous hydrogen fluoride and returning the condensed hydrogen fluoride to the reaction mixture and recovering the resultant product.

3. A process for the preparation of benzotrifluoride by reacting together at substantially atmospheric pressure benzotrichloride and a stoichiometric excess of liquid hydrogen fluoride which comprises slowly adding said benzotrichloride to said hydrogen fluoride at a rate so that the reaction temperature is maintained between —4 and 19° C., continuously agitating the reaction mixture, condensing evolved, gaseous hydrogen fluoride and returning the condensed hydrogen fluoride to the reaction mixture and recovering the resultant product.

References Cited in the file of this patent
UNITED STATES PATENTS
2,005,712   Holt et al. _____ June 18, 1935

OTHER REFERENCES

Simons et al.: "Jour. Am. Chem. Soc," vol. 60 (1938), page 492.

Stacey et al.: Advances in Fluorine Chemistry, Butterworth, Inc., Washington, D.C. (1963), volume III, p. 227.